June 3, 1941.  W. G. GRIMES  2,244,535
LANDING LIGHT FOR AIRPLANES
Filed Aug. 16, 1937  2 Sheets-Sheet 2
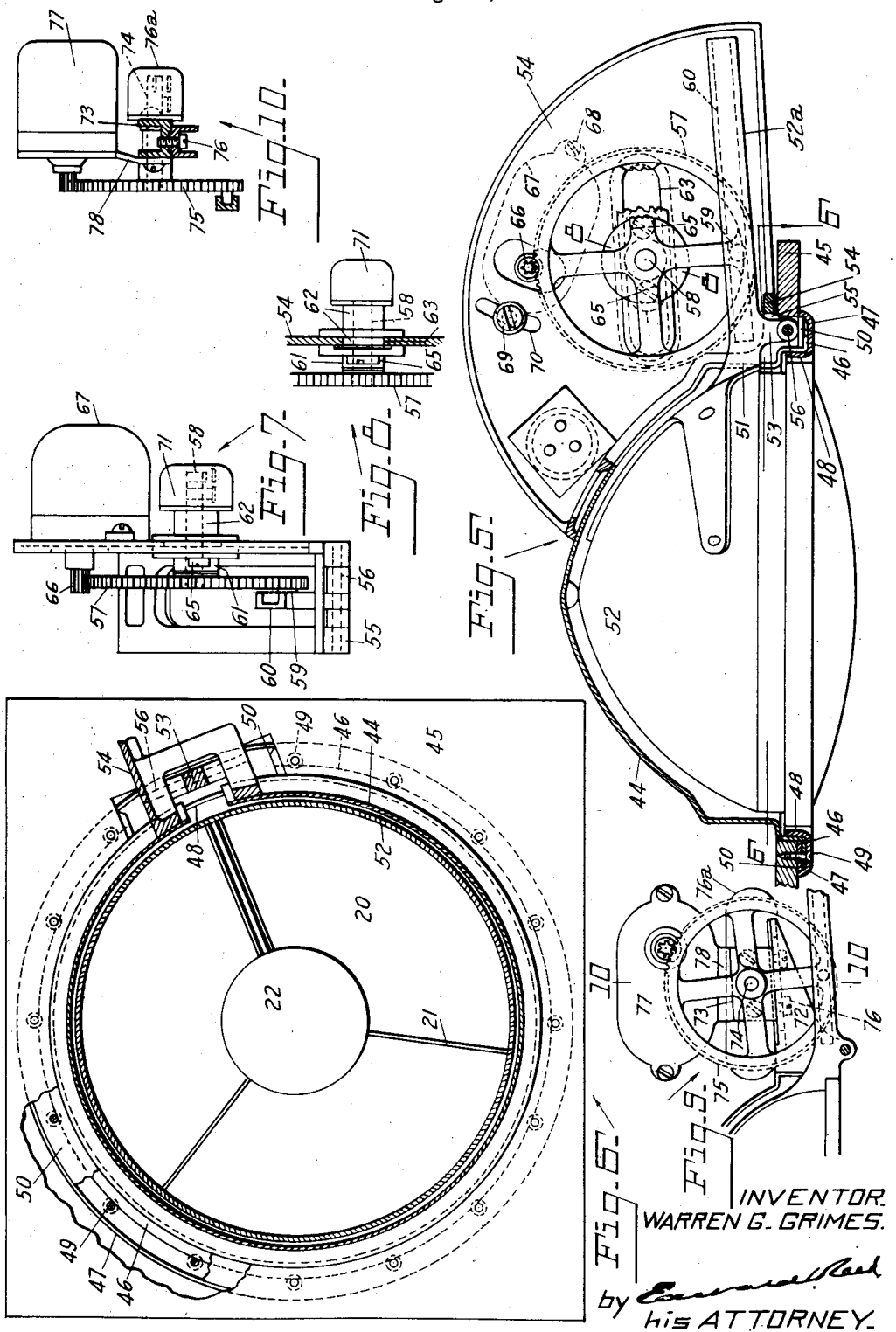
INVENTOR.
WARREN G. GRIMES.
by Edward Reed
his ATTORNEY.

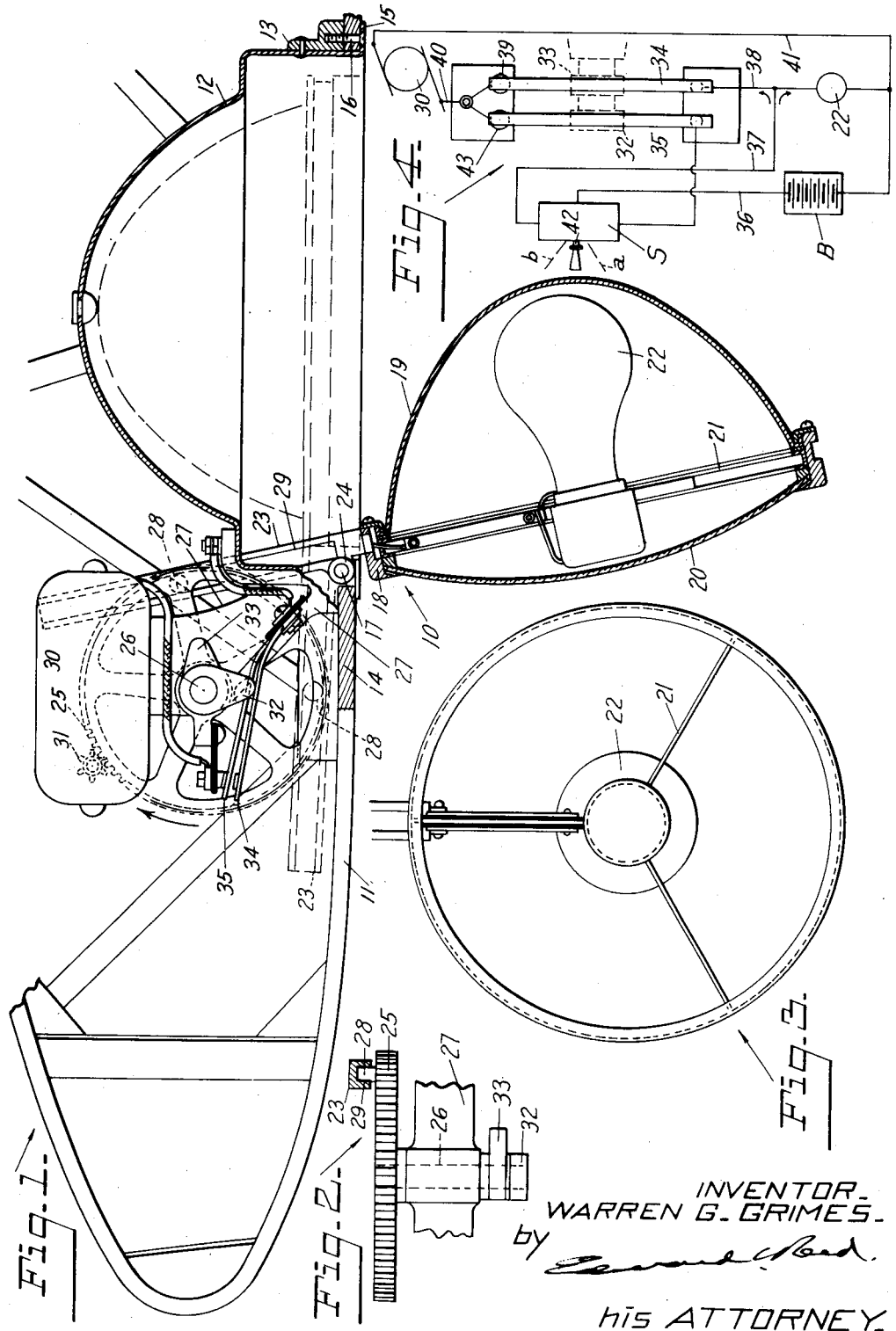

Patented June 3, 1941

2,244,535

UNITED STATES PATENT OFFICE 2,244,535

LANDING LIGHT FOR AIRPLANES

Warren G. Grimes, Urbana, Ohio

Application August 16, 1937, Serial No. 159,263

20 Claims. (Cl. 240—7.7)

This invention relates to a landing light for airplanes and the like and is a continuation in part of the application filed by me November 4, 1935, Serial No. 48,068, which has matured into Patent No. 2,124,346 issued July 19, 1938.

It is customary to provide an airplane with landing lights which are mounted on the end portions of the respective wings for movement into and out of cavities in the lower sides of the wings. Such a landing light usually comprises a fixture pivotally mounted on the wing and is moved into and out of its extended or operative position by manually operated mechanism, such as cables. It is one object of the present invention to provide a landing light of this kind which will be power operated, as by an electric motor, so that the only action required on the part of the pilot will be to initiate the operation of the mechanism, as by the closing of the switch.

To this end it is a further object of the invention to provide such a power operated landing light with means for automatically interrupting the movement of the fixture by the operating means when it has reached either its extended position or its retracted position.

A further object of the invention is to provide such a landing light with motor driven operating mechanism which will be simple and compact in its construction and of light weight.

A further object of the invention is to provide such a landing light and its operating mechanism which can be assembled prior to installation and then installed on the airplane as a unit.

When such a landing light is in its extended position the light is projected therefrom forwardly and downwardly and a further object of the invention is to provide means whereby the movement imparted to the fixture by the operating mechanism may be varied to change the downward angle at which the light is projected.

Such a landing light is usually so positioned on the airplane that the light will also be projected forwardly and laterally with relation to the line of movement of the airplane and in order that the lateral angle of projection may be varied to accommodate the same to different conditions or to the ideas of different pilots it is a further object of the invention to provide means for adjusting the pivotal axis of the fixture with relation to the airplane.

Other objects of the invention may appear as the apparatus is described in detail.

In the accompanying drawings Fig. 1 is a side elevation, partly in section, of a landing light embodying my invention, showing the same mounted on an airplane wing; Fig. 2 is a detail of the actuating device showing the connection between the same and the fixture; Fig. 3 is a front elevation of the fixture with the arm broken away; Fig. 4 is a circuit diagram; Fig. 5 is a side elevation, partly in section, of a modified form of the landing light; Fig. 6 is a sectional view taken on the line 6—6 of Fig. 5; Fig. 7 is an end view, partly in section, of the landing light shown in Fig. 5; Fig. 8 is a section taken on the line 8—8 of Fig. 5; Fig. 9 is a detail view of a portion of a landing light showing a modified arrnagement of the actuating mechanism; and Fig. 10 is an end elevation, partly in section, of the mechanism shown in Fig. 8.

As shown in these drawings the landing light comprises a fixture, indicated as a whole by the reference numeral 10, which is pivotally mounted on an airplane wing 11 for movement, about an axis transverse to the line of movement of the airplane, into and out of a retracted position, the wing of the airplane being provided with an opening or cavity to receive the fixture when in its retracted position. Preferably a housing 12 is mounted within the wing to enclose the space occupied by the fixture when it is in its retracted position and this housing may and, in the present instance does, constitute the supporting structure for the fixture. As shown in Fig. 1, the housing its approximately dome-shaped and is rigidly secured near its open edge to an annular reinforcing member 13 which in turn is rigidly secured to the wing. As here shown, the housing is mounted on a base plate 14 which may conveniently be formed of plywood, and which is rigidly secured to the wing. The shell of the housing, which may be of sheeted metal, extends beyond the reinforcing member 13 and is provided with a flange 15 which extends beneath the base plate 14 and is secured thereto by screws 16 which extend through the flange and base plate into the reinforcing member.

The fixture 10 is pivotally mounted on the wing on an axis which is fixed with relation to the housing and as shown in Fig. 1 it is mounted on a pivot pin 17 mounted in the reinforcing member of the housing. In this particular embodiment of the invention the fixture comprises an annular frame 18 on which is mounted a reflector 19 and a lens 20. A lamp supporting structure 21 is mounted on the frame between the reflector and the lens to support the lamp 22. The fixture may be moved to and from light projecting position by an actuating device of any suitable character but preferably the actuating device includes a part rigidly secured to the fixture and a motor driven member supported on the wing and acting on the first mentioned part to move the fixture about its pivotal axis. In the arrangement here shown an elongated part or arm 23 is rigidly secured to the frame 18 and forms a part of the fixture, this arm extending a considerable distance beyond the axis 17 of the fixture and the pivot lugs 24 which receive the pivot pin 17 may, if desired, be formed on the arm. An actuating member is mounted on the wing in fixed relation to the pivotal axis of the fixture and is here shown as a spur gear 25 mounted on a shaft 26, which is carried by a bracket 27, secured to and forming a part of the supporting structure or housing. This rotatable actuating member is provided at a point spaced from the axis thereof with a laterally extending stud 28 which extends into a guideway or channel 29 formed in the arm 23 and extending lengthwise thereof and acts upon that arm with a cam action to move the fixture about its pivotal axis. When the fixture is in its retracted position, as shown in dotted lines in Fig. 1, the arm 23 will extend substantially parallel with the wing and the stud 28 will be located directly below the shaft 26. Upon the rotation of the actuating member in the direction of the arrow shown in Fig. 1, the stud will act on the outer side wall of the guideway to rotate the arm and fixture about the pivotal axis thereof and when the stud has completed approximately three-fourths of a revolution the fixture will have been moved to its extended or operative position, as shown in full lines in Fig. 1. During this movement the stud will act on the fixture through the arm with a long leverage, and correspondingly great power, to move the fixture against wind resistance and the movement of the fixture will be correspondingly slow. To return the fixture to its retracted position the actuating member is rotated in the same direction through the remaining quarter of the revolution and during this relatively short movement the stud acts on the inner wall of the guideway to quickly return the fixture to its retracted position. While the power thus exerted upon the fixture is less than that exerted during its outward movement it will be obvious that no wind resistance is offered to the return movement of the fixture.

The actuating member is preferably driven by an electric motor 30 which is provided with a pinion 31 meshing with the actuating member or gear 25, and connected with the motor shaft through suitable reducing gearing not here shown, and the pinion is of small diameter so that the gear has a relatively slow movement. When the fixture reaches either its extended position or its retracted position its movement by the motor is automatically interrupted. For this purpose the shaft 26 of the actuating device is provided with two cams 32 and 33 which are mounted on the shaft for rotation with the actuating member 25 and are adapted to respectively engage and actuate the contact members 34 and 35 of two switches which control two separate circuits which successively supply current to the motor. These contact members are biased to circuit closing position and are preferably in the form of resilient arms. The cams are so arranged with relation to the stud 28 of the actuating member that the cam 32 will engage the contact member 34 and open that switch just before the fixture reaches its operative position, and the cam 33 will engage the contact member 35 and open that switch just before the fixture completes its return movement.

In the circuit diagram of Fig. 4 I have shown the source of current supply as a battery B which is connected by a conductor 36 with a two-way master switch S. One side of this switch is connected by conductors 37 and 38 with the contact member 34. The stationary contact 39 with which the contact member 34 engages is connected with one side of the motor 30 by a conductor 40 and the other side of the motor is connected by a conductor 41 with the battery B. The lamp 22 is connected with the conductor 37 between the contact member 34 and the master switch, and with the conductor 41, so that this lamp will be controlled by the motor switch independently of the contact member 34. When the handle 42 of the master switch is moved to the dotted line position a, the handle being in the present instance pivoted between its ends, the current will flow from the battery through the master switch and the supplemental switch 34—39 to the motor, thus energizing the motor and initiating the movement of the light fixture. At the same time the circuit is closed through the lamp 22 so that the fixture is illuminated at the beginning of its outward movement. When the fixture has reached its extended or operative position the cam 32 will act on the contact member 34 to open the circuit through the motor and thus interrupt the movement of the fixture, but the lamp being connected with the motor circuit in advance of the contact member 34, will not be affected by the stopping of the motor and the illumination will continue until its circuit is opened at the master switch. When the landing has been effected and the light fixture is to be retracted the master switch is moved to the dotted line position b, thus closing the circuit through the supplemental switch comprising the contact member 35 and its stationary contact 43, which is connected with the motor through the conductor 40, thus closing the circuit through the motor without closing the circuit through the lamp and causing the actuating device to complete its single revolution. When the fixture has reached its retracted position the cam 33 will engage the yieldable contact member 35 and open the circuit, thereby again interrupting the rotation of the motor. The cam 33 will continue to hold the switch in its open position while the fixture is in its retracted position and the handle of the master switch may be either left in the position b or returned to neutral. The cam 32 having been moved out of engagement with the contact member 34 by the second operation of the motor this switch will be closed when the fixture reaches its retracted position and the circuit through the same may be then completed at any time by moving the master switch to position a.

In Figs. 5, 6 and 7, I have illustrated a modified form of the invention which is provided with means for controlling the distance which the fixture is moved by the actuating device and with means for adjusting the pivotal axis of the fixture with relation to the airplane to control the lateral angle at which the light is projected. As there shown, the supporting structure or housing 44 is mounted on a base plate 45, carried by the wing, and an annular edge portion of the housing extends through the opening in the base plate and is provided with a flange 46 which extends beneath the base plate and is secured thereto by an annular clamping member 47 which lies beneath the flange 46 and has a guide portion 48 extending into the opening and engaging the adjacent portion of the housing. The clamping member 47 is secured to the base plate by screws 49 which extend through the clamping member beyond the edge of the flange 46 of the housing. If desired, a metal ring or washer 50 may be interposed between the flange 46 and the base plate. The fixture comprises an annular frame 51 and a reflector 52 similar to those above described but the elongate member or arm 52a is rigidly secured to the reflector at a point spaced some distance from the frame 51 and is provided with depending pivot lugs 53. Rigidly secured to the housing 44 is a member 54 which forms part of the supporting structure and is here shown as a plate approximately sector-shaped. This supporting member is provided with pivot lugs 55 with which the pivot lugs 53 of the arm 52a are connected by a pivot pin 56. The actuating member is shown as a gear 57 carried by a shaft 58 and is provided with a stud 59 which extends into the longitudinal guideway 60 in the arm 52a and actuates the fixture in the manner heretofore described. The shaft 58 is journaled in a bearing mounted on the supporting plate 54, as hereinafter described, and extends beyond the supporting plate into a switch box 71 where it is provided with means for actuating the supplemental switches in the manner heretofore described. In order to vary the amount of movement imparted to the fixture by the predetermined movement of the actuating member the latter is made adjustable with relation to the pivotal axis of the fixture and in the construction here shown the bearing for the shaft 58 comprises two parts 61 and 62, the part 62 having a portion of its bearing slidably mounted in a slot 63 formed in the supporting plate 54 and extending lengthwise of the arm 52a when the latter is in its retracted position. The parts 61 and 62 have enlarged portions or flanges bearing against the respective sides of the supporting plate 54 and clamped tightly against the same by screws 65. By loosening the screws 65 the shaft 58 and its bearing may be moved lengthwise of the slot and then secured in an adjusted position by again tightening the screws, thereby causing the stud 59 to act on the arm 52a at different distances from the pivotal axis of the latter and imparting different amounts of movement to the fixture. The switch box 71 is supported on the part 62 of the bearing by the screws 65 and moves with the bearing when the latter is adjusted. This adjustment of the actuating gear 57 changes the relation of the gear to the pinion 66 which actuates the same and which is carried by the motor 67. To enable the pinion to be maintained in proper mesh with the gear the motor is made adjustable and, as here shown, it is secured at its respective ends to the supporting plate 54 by screws 68 and 69, the screw 69 extending through an arcuate slot 70 in the supporting plate. Thus by loosening the screws pivotal movement may be imparted to the motor to adjust the pinion with relation to the gear and the motor then secured in its adjusted position by tightening the screws. In this manner the amount of outward movement imparted to the fixture may be regulated to vary the downward angle at which the light is projected. The lateral angle at which the light is projected may be varied by loosening the screws 49 which connect the housing or supporting structure to the base plate and rotating that housing with relation to the base plate, thus changing the angular position of the pivotal axis 56 of the fixture with relation to the airplane, and then again tightening the screws 49 to firmly clamp the housing in its adjusted position.

In Figs. 9 and 10 I have shown a modified form of the actuating mechanism in which the actuating gear and motor are adjustable as a unit. As there shown, the supporting structure is provided with a relatively short supporting member or arm 72 on which is slidably mounted a bearing block 73 in which is journaled the shaft 74 of the actuating device. On one side of the bearing block the shaft is secured to the actuating gear 75 and on the other side of the bearing block the shaft extends into a switch box 76a where it is provided with means for actuating the supplemental switches, this switch box being supported by the bearing block 73. The bearing block is adjustable lengthwise of the supporting member 72 and, in the present construction, the supporting member is provided with a longitudinal slot through which extend screws 76 which are threaded into the bearing block and which permit of the adjustment of the bearing block lengthwise of the supporting member by loosening the screws and again tightening the same to secure the bearing block in its adjusted position. The motor 77 is supported on the bearing block by a bracket 78. Thus the actuating device, switch box and motor are all carried by the bearing block and may be adjusted as a unit.

While I have shown and described one embodiment of my invention, together with certain modifications thereof, I wish it to be understood that I do not desire to be limited to the details thereof as various modifications may occur to a person skilled in the art.

Having now fully described my invention, what I claim as new and desire to secure by Letters Patent, is:

1. A landing light mechanism for an airplane, comprising in combination with a light fixture having means for movably mounting the same on a wing of said airplane, a motor, means driven by said motor for actuating said fixture, and means actuated by said motor in accordance with the movement of said fixture to interrupt said movement when said fixture has been moved to a predetermined position.

2. A landing light mechanism for an airplane, comprising in combination with a light fixture having means for movably mounting the same on a wing of said airplane, operating mechanism for said light fixture mounted wholly within said wing adjacent said fixture and including a motor, and actuating means driven by said motor for moving said light fixture to light projecting position, and means operating in timed relation to said fixture to interrupt the movement of said fixture when it has reached a predetermined position.

3. A landing light mechanism for an airplane, comprising in combination with a light fixture having means for movably mounting the same on a wing of said airplane, a motor, means driven by said motor for actuating said fixture, means actuated by said motor in accordance with the movement of said fixture to interrupt said movement when said fixture has been moved to a predetermined position, and means for causing said motor to again operate said actuating means to return said fixture to its initial position.

4. A landing light mechanism for an airplane, comprising in combination with a light fixture having means for movably mounting the same on a wing of said airplane, a motor, means driven by said motor for actuating said fixture, means under the control of the operator to cause said actuating means to move said fixture first in one direction and then in another direction, and means including a device actuated by said motor in accordance with the movements of said fixture to interrupt the movement of said fixture at the end of a predetermined movement in either direction.

5. A landing light mechanism for an airplane, comprising in combination with a light fixture having means for movably mounting the same on a wing of said airplane, a motor, an actuating member connected with said motor for rotation thereby in one direction only, means for connecting said actuating member with said fixture to cause the latter to be moved successively in opposite directions by the rotation of said member in said one direction, and means including a part driven by said motor in timed relation to said actuating member for interrupting the movement of said fixture at the end of a predetermined movement thereof.

6. A landing light mechanism for an airplane, comprising in combination with a light fixture having means for movably mounting the same on a wing of said airplane, a device for actuating said fixture, an electric motor having driving connection with said actuating device, a switch in circuit with said motor to initiate the operation thereof, a supplemental switch in said circuit, and means actuated by said motor to open said supplemental switch when a predetermined movement has been imparted to said fixture.

7. A landing light mechanism for an airplane, comprising in combination with a light fixture having means for movably mounting the same on a wing of said airplane, a device for actuating said fixture, an electric motor having two circuits, means for connecting said motor with said actuating device to cause the latter to move said fixture from a retracted position to an extended position when one of said circuits is closed and to return said fixture to its retracted position when the other of said circuits is closed, a master switch to separately energize said circuits, a normally closed switch in each of said circuits, and means actuated by said motor in timed relation to the movements of said fixture to open the normally closed switch in the first mentioned circuit when said fixture has been moved to its extended position and to open the normally closed switch in the last mentioned circuit when said fixture has been moved to its retracted position.

8. A landing light mechanism for an airplane, comprising in combination with a light fixture having means for pivotally mounting the same on the wing of said airplane, a part secured to said fixture and extending beyond the pivotal axis thereof, a rotatable actuating member having a part acting on the first mentioned part to move said fixture first in one direction and then in the opposite direction, a motor having driving connection with said actuating member, and means to interrupt the movement of said fixture when it has been moved to a predetermined position.

9. A landing light mechanism for an airplane, comprising in combination with a light fixture having means for pivotally mounting the same on a wing of said airplane, an arm secured to that side of said fixture adjacent the pivotal axis thereof, extending beyond said axis and provided with a longitudinal guideway, a rotatable actuating member, a stud connected with said actuating member and operating in the guideway of said arm to move said fixture in one direction about said axis during the first portion of the rotation of said actuating member and in the opposite direction during a further rotation of said actuating member in the same direction, a motor having driving connection with said actuating member, and means to interrupt the movement of said fixture when the latter has been moved to a predetermined position.

10. A mechanism for moving a light fixture into and out of light projecting position with relation to the wing of an airplane comprising a light fixture having means for pivotally mounting the same on said wing, an arm secured to said fixture, extending beyond the pivotal axis thereof, arranged within said wing and provided with a longitudinal guideway, an actuating member mounted within said wing for rotation about an axis parallel with the pivotal axis of said fixture and having a stud operating in said guideway to move said fixture about said axis, said arm and said actuating member being so arranged that the movement of said stud through an arc of approximately 270 degrees will move said fixture to its extended position and a further movement of said stud through an arc of approximately 90 degrees in the same direction will restore said fixture to its retracted position, and a motor mounted within said wing and operatively connected with said actuating member.

11. A landing light and operating mechanism therefor adapted to be installed as a unit within the wing of an airplane and comprising a supporting structure adapted to be mounted in said wing, a light fixture pivotally mounted on said structure, an actuating device carried by said structure and operatively connected with said fixture, and a motor carried by said structure and having driving connection with said actuating device, and controlling means to cause said fixture to be moved first in one direction and then in the other direction.

12. A landing light and operating mechanism therefor adapted to be installed as a unit in the wing of an airplane and comprising a supporting structure adapted to be mounted in said wing, a light fixture pivotally mounted on said structure, an actuating device carried by said structure and operatively connected with said fixture, and a motor carried by said structure and having driving connection with said actuating device, controlling means to cause said fixture to be moved from a retracted position to an extended position and to be thereafter returned to its retracted position, and means actuated in accordance with the movement of said fixture to automatically interrupt said movement when said fixture has been moved a predetermined distance in either direction.

13. A landing light or the like comprising a normally stationary supporting structure adapted to be mounted on an airplane, a light fixture pivotally mounted on said structure on an axis fixed with relation thereto, an actuating device carried by said structure and operatively connected with said fixture, a motor carried by said structure and having driving connection with said actuating device, controlling means to cause said fixture to be moved first in one direction and then in the other direction, and means for adjusting said supporting structure to change the angular position of the pivotal axis of said fixture with relation to said airplane.

14. In a landing light or the like, a housing having an annular portion adapted to be secured to an airplane, a light fixture mounted on an axis fixed with relation to said annular portion for movement into and out of said housing, an actuating device for said fixture, means for imparting movement to said actuating device, said annular portion of said housing being adjustable about the axis thereof to vary the angular position of the pivotal axis of said fixture with relation to said airplane, and means for rigidly securing said annular portion in its adjusted position.

15. A landing light or the like comprising a supporting structure, a light fixture having means for mounting the same on said structure for movement about a pivotal axis, an actuating device for said fixture, means for imparting movement to said actuating device, said supporting structure having means for mounting the same on the wing of an airplane with the axis of said fixture in a plane substantially parallel with the surface of said wing and for movement with relation to said wing to vary the angular position of said axis with relation to the line of movement of said airplane, and means for rigidly securing said structure in adjusted positions on said wing.

16. A landing light or the like comprising a light fixture having means for pivotally mounting the same on an airplane and having a part extending beyond its pivotal axis, a rotatable actuating device acting on said part to move said fixture about said pivotal axis, means for imparting a predetermined movement to said actuating device, means for adjusting the axis of said rotatable actuating device with relation to the pivotal axis of said fixture to vary the movement imparted to said fixture by said predetermined movement of said actuating device.

17. A landing light or the like comprising a light fixture having means for pivotally mounting the same on an airplane and having a part extending beyond its pivotal axis, a supporting structure mounted in fixed relation to the pivotal axis of said fixture, a bearing mounted on said structure for movement lengthwise of said part of said fixture with its axis transverse to said part of said fixture in all positions of the latter and having means for securing the same in adjusted positions on said structure, a shaft journaled in said bearing, an actuating device carried by said shaft and acting on said part of said fixture to impart movement to said fixture, the movement imparted to said fixture by a given movement of said actuating device being determined by the adjustment of said bearing.

18. A landing light or the like comprising a light fixture having means for pivotally mounting the same on an airplane and having a part extending beyond its pivotal axis, a supporting structure mounted in fixed relation to the pivotal axis of said fixture, a bearing mounted on said structure for movement lengthwise of said part of said fixture and having means for securing the same in adjusted positions, a shaft journaled in said bearing, an actuating device carried by said shaft and acting on said part of said fixture to impart movement to said fixture, said actuating device including a gear, a motor mounted on said supporting structure, and a pinion carried by said motor and adapted to mesh with said gear, said motor being adjustable to mesh said pinion with said gear in different adjusted positions of the latter.

19. A landing light or the like comprising a light fixture having means for pivotally mounting the same on an airplane and having a part extending beyond its pivotal axis, a supporting structure mounted in fixed relation to the pivotal axis of said fixture, a bearing mounted on said structure for movement lengthwise of said part of said fixture and having means for securing the same in adjusted positions, a shaft journaled in said bearing, an actuating device carried by said shaft and acting on said part of said fixture to impart movement to said fixture, a motor connected with said bearing for adjustment therewith, and a driving connection between said motor and said actuating device.

20. A landing light or the like comprising a light fixture having means for pivotally mounting the same on an airplane, an actuating device to move said fixture about its pivotal axis from a retracted position to an extended position, a motor having driving connection with said actuating device, and means for adjusting said actuating device and said motor as a unit with relation to the pivotal axis of said fixture to vary the amount of movement imparted to said fixture by said actuating device.

WARREN G. GRIMES.